Feb. 11, 1941.     H. N. FAIRBANKS     2,231,665
LOOP FORMING MEMBER FOR SPROCKETLESS FILM HANDLING APPARATUS
Filed July 22, 1938

HENRY N. FAIRBANKS
INVENTOR

BY Newton M. Perrins
George A. Gillette Jr.
ATTORNEYS

Patented Feb. 11, 1941

2,231,665

UNITED STATES PATENT OFFICE 2,231,665

LOOP FORMING MEMBER FOR SPROCKET-LESS FILM HANDLING APPARATUS

Henry N. Fairbanks, Rochester, N. Y., assignor to Eastman Kodak Company, Rochester, N. Y., a corporation of New Jersey Application July 22, 1938, Serial No. 220,678

7 Claims. (Cl. 88—17)

This application is a continuation-in-part of my copending application, Serial No. 80,164, filed May 16, 1936. The present invention relates to an improvement in loop-forming members for a sprocketless film handling apparatus and more particularly to stationary or fixed guide members which cause the natural resiliency of the film to form loops therein.

One of the common expedients for simplifying the construction of a film handling apparatus is the omission of a film sprocket for moving the usual preformed film loops. Film tensioning control means are a well recognized substitute for the film sprocket and such film control means have previously been provided as resilient members or spring arms.

The primary object of the present invention is the provision of a sprocketless film handling apparatus which does not include a film sprocket and which does not include resilient guiding members but which has fixed loop forming members for causing the natural resiliency of the film to form film loops which function in a manner very similar to the resilient film tension controlling means previously known.

Another object of the invention is the provision of a pair of loop-forming studs at each end of the film gate in a sprocketless film handling apparatus and these studs respectively cause formation of resilient film loops between the film rolls and the respective ends of the film gate.

Other and further objects of the invention will be apparent to those skilled in the art from the disclosure which follows.

The above and other objects of the invention are realized in a sprocketless film handling apparatus in which loop-forming members are fixed adjacent each end of the film gate and are located slightly to displace the film strips between the film rolls and film gate from their straight line paths so that the inherent resiliency of the film causes the formation of a film loop in said film strips. The loop forming functions of such loop forming members are accomplished most efficiently and with minimum friction when the film rolls are mounted with their opposed sides beyond the loop forming members and/or when the loop forming members are somewhat displaced from the film plane of the gate in the direction toward the film rolls.

Reference is hereby made to the accompanying drawing, wherein similar reference characters designate similar elements and wherein.

Figure 2:
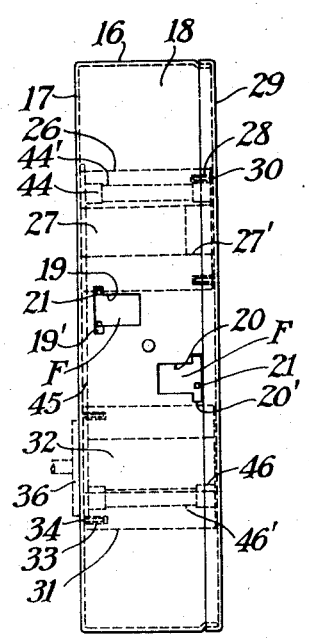
Fig. 2 is a front elevation of the film magazine which is of the reversible or invertible type.

Although the invention is to be explained with respect to a motion picture camera and film magazine therefor, it is clear that the invention is equally applicable to any type of sprocketless film handling apparatus.

The motion picture camera which is illustrated by way of example only comprises a casing 10 having an edge wall 11 upon which an objective 12 is mounted. A front plate 13 is provided with an exposure frame 14 and forms the front wall of the magazine chamber 15 within camera casing 10.

The film magazine comprises a magazine casing 16 having a side wall 17 and a lateral wall 18 extending around the edge of side wall 17. The front lateral wall 18 is provided with a pair of exposure apertures 19 and 20, each having enlarged portions 19' and 20' through which the film perforations 21 in the film F are available. An auxiliary lateral wall 22 is mounted behind the front lateral wall 18 of the film magazine and is provided with an exposure aperture 23 in registration with exposure aperture 19 and is provided with an exposure aperture 24 which is in registration with exposure aperture 20 in the front lateral wall 18.

The film supply roll 25 is wound upon a film core 26. Said film core 26 is provided with an axial hole 27' and is rotatably mounted upon a spindle 27 which is fastened to side wall 17 of the magazine casing 16. One end of film core 26 is provided with an annular groove 28. The magazine casing 16 is enclosed by a cover 29 from which an annular collar 30 is formed, said annular collar 30 fits into the annular groove 28 of core 26 to form a light-tight joint between core 26 and cover 29. The take-up film core 31 is provided with an axial hole 32' and is rotatably mounted upon a spindle 32 which is fastened to the film magazine cover 29. One end of said core 31 is provided with an annular recess 33, see Fig. 2, which fits over an annular collar 34 formed from the side wall 17 of magazine casing 16.

The camera contains a spring motor, not shown, but in driving engagement with a pinion gear 35. Said pinion gear 35 carries a friction disc 36, see Fig. 2, for frictionally engaging the end of take-up film core 31 which is available through the opening within annular collar 34 of side wall 17. Thus the take-up film core 31 is frictionally driven to take up the film F.

The film is conducted from the supply film roll 25 through a film loop F' past the exposure apertures 19, 20, 23 and 24 and through the lower film loop F'' to the take-up film core 31. The extreme ends of film F may be attached to cores 26 and 31 in any conventional manner such as by slots 26' and 31' therein. One form of the film gate, see Fig. 1, may comprise a pressure pad 37 which is resiliently urged toward the apertured portion of auxiliary lateral wall 22 by means of a spring member 38 having a pair of tabs 39 engaging each side of pressure pad 37 and supported upon a pair of posts 40.

A film advancing mechanism may enter the film magazine through the enlarged portion 19' of exposure aperture 19 to engage the perforations 21 of the film F. Such film advancing mechanism may comprise a claw arm 41 which is pivotally connected to an eccentric disc 42 and which is resiliently urged into said enlarged portion 19' and into engagement with film perforation 21 by means of a spring 43. Each stroke of the intermittent film advancing mechanism advances the film F a distance of one frame with respect to the exposure aperture 19.

Figure 1:
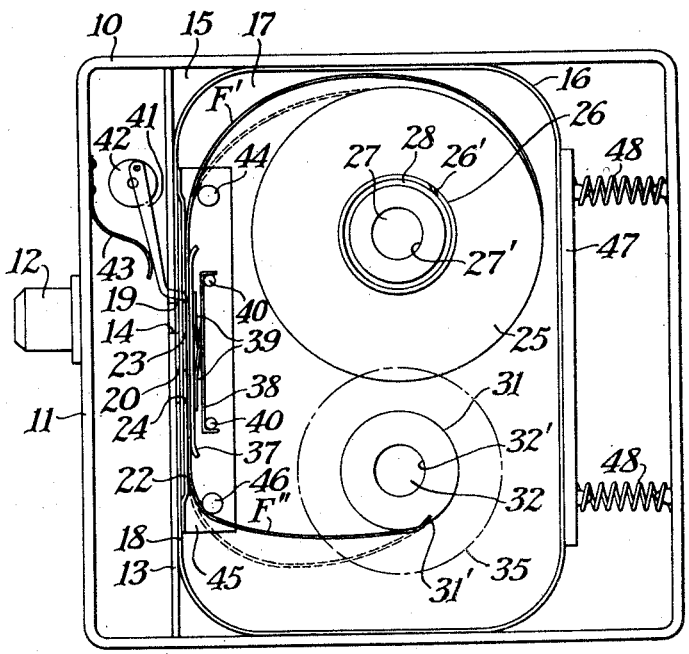
Fig. 1 is a side elevation of a motion picture apparatus of the magazine type with its cover removed and containing a film magazine which is equipped with fixed film engaging members according to the invention.

If such intermittent movement of the film is transmitted directly to the supply film roll, the inertia of the supply film roll, especially when said roll is full as shown in Fig. 1, will react to overload and seriously retard the film advancing mechanism. Also the advancing mechanism will jerk the film roll 25 to cause over-running of the film roll and the formation of several loose convolutions therearound with consequent variation in the load upon the film advancing mechanism. If the intermittently advanced film is directly wound onto the frictionally driven take-up roll, the take-up drive will slip intermittently and may draw the film through the gate. All of these conditions individually and/or simultaneously cause unsteadiness of the film at the gate and have been previously overcome by the provision of spring members which bear upon the film strips between the film rolls and respective ends of the gate. However, according to the present invention compensation for such conditions of unsteadiness can be obtained in a more reliable and much simpler manner as will now be explained.

According to the present invention, a film guiding member is fixed adjacent one end of the film gate to engage the film strip or upper film loop F' to cause the natural resiliency in the film to form a resilient loop between the gate and the supply film roll. Such a film guiding member may be provided as a stud 44 fastened to a frame 45 within the magazine casing 16. Similarly, a second stud 46 is fastened also to frame 45 and is located adjacent the other end of the film gate to engage the lower film loop F'' and to cause the natural resiliency in the film to form a resilient loop. Each of said studs 44 and 46 may be undercut as at 44' and 46', respectively, see Fig. 2, so that engagement of said studs 44 and 46 with the film F will not abrade or scratch the central areas thereof.

The purpose of the upper loop forming stud 44 is to engage the film strip between the supply film roll 25 and the film gate and to displace such film strip from the straight line path therebetween so that the natural resiliency of the film causes the formation of the upper film loop F'. The intermittent movement of the film F at the gate reduces the size of loop F' to some such position as shown by the dotted lines in Fig. 1 and creates an increasing resilient tendency to rotate the supply film roll 25. As the supply film roll 25 is rotated by such tendency the film again by virtue of its inherent resiliency returns to the position F' shown by full lines in Fig. 1.

The conditions encountered between the film gate and the take-up film core 31 are somewhat different. It is also desirable to have the take-up rotate evenly and without affecting the film movement at the exposure aperture. At the end of the film advancing stroke, the lower resilient film loop is created as indicated by dotted lines in Fig. 1 and this resilient loop is wound upon the take-up film core 31. It may be that the lower stud 46 provides some snubbing action as the lower resilient film loop F'' is reduced as shown by the full lines in Fig. 1. Obviously, the snubbing effect on the film around stud 46 will be increased as the lower film loop F'' is decreased or taken up by the take-up film core 31. This increase in snubbing action may be effectively employed to overcome the friction in the take-up drive or again the snubbing action may be augmented by the friction in the film gate definitely to overcome the friction drive of the take-up when there is no slack film.

Where provision of a loop forming device of minimum friction is of prime importance, such as within a spring driven camera, a precise balance must be obtained between the displacement of the film strips F' and F'' by the loop forming studs from the straight line paths from the film gate to the film rolls and also between the snubbing or frictional action of such loop forming studs upon the film strips F' and F''. Obviously, sharply bending the film strips around the loop forming studs will produce more than enough displacement of the film strips so that the inherent resiliency of the film will form resilient loops therein but at the same time excessive friction or snubbing will occur at such loop forming studs to affect the desirable and efficient operation of the apparatus.

An important feature of the present invention is the relative locations of the film gate, film rolls and loop forming studs so that such a precise balance is obtained. To this end the pair of supports for the film rolls, such as film core 26 and spindle 27, film core 31 and its spindle 32, are located respectively with respect to loop forming studs 44 and 46 so that the opposite sides of the supply film roll 25 and the take-up film roll are beyond said loop forming studs. In other words, the paying-off side of supply film roll 25 is above and beyond the level of the loop forming stud 44 while the paying-in side of the take-up roll is below and beyond the loop forming stud 46. In fact the innermost convolutions of each film roll have their opposite sides beyond the loop forming studs 44 and 46 so that said opposite sides, or paying-off and paying-in sides, of the film rolls are at all times during the film run beyond said studs 44 and 46. Another factor contributing to loop formation with minimum friction is the location of the studs 44 and 46 out of the film plane of the film gate and the displacement of said studs 44 and 46 from said film plane toward the film rolls.

As a result of such relative locations of the film gate, film rolls and loop forming studs, the film loops F' and F" may momentarily move out of contact with the studs 44 and 46 so that the reduced friction between the loop forming studs and film is obtained by avoiding sharp bends in the film and/or by obtaining only intermittent contact between the film strips and said loop forming studs.

The exact operation and function of said loop forming members are not easily determined but actual tests on sprocketless film handling apparatus constructed as shown herein established that the film is smoothly and evenly unwound from the supply film roll and onto the take-up film roll, that the inertia of the supply film roll and action of the take-up drive are compensated by the film loops because the pictures taken are very steady, and that there is an appreciable reduction in friction evidenced by a longer film run for a single winding of the spring motor.

The film magazine casing 16 may be held in position within magazine chamber 15 by a plate 47 which bears against the rear edge of casing 16 and which is actuated by a pair of springs 48.

The resilient loop forming members of the present invention are particularly well suited for use in magazine cameras of the cine eight type or in which the film magazine is inverted for the second run of the film. In this type of magazine the upper stud 44 functions in the manner just described to prevent the transmission of the intermittent movement at the film gate back to the supply film roll 25, while the lower stud 46 prevents the intermittent movement at the exposure aperture and the friction take-up drive from having undesirable effects upon each other. Since the film rolls and studs 44 and 46 are inverted for the second run of the film, the former take-up roll becomes the supply film roll and the stud which formerly caused the formation of the resilient film loop to prevent the intermittent and take-up from affecting each other now causes the formation of a resilient film loop to prevent the intermittent from affecting the even rotation of the supply film roll. At the same time, the stud which formerly prevented intermittent motion being transmitted to the supply film roll now supervises the even winding of the take-up film core 31.

Figure 3:
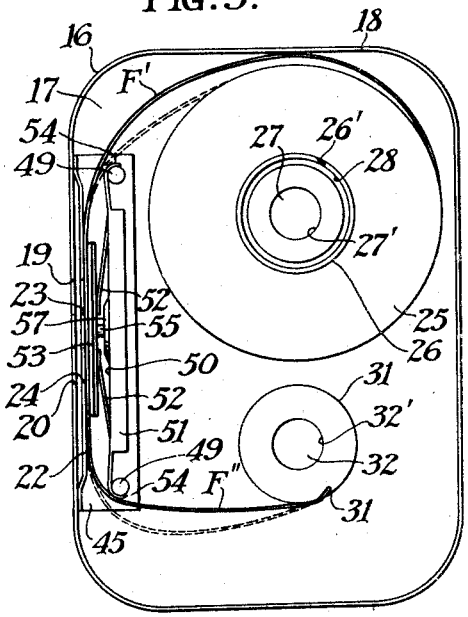
Fig. 3 is a side elevation of a modified and preferred form of the fixed film guiding members within the film magazine.
Figure 4:
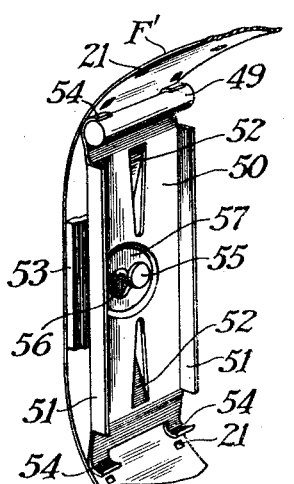
Fig. 4 is a perspective view of the preferred form of the resilient means for the film gate.

A modified and preferred form of the film guiding members according to the invention is illustrated in Figs. 3 and 4. The film rolls and film gate are provided in the same manner as shown in Fig. 1 except that the spring member behind the pressure pad has its extremities arranged so as to perform the loop forming functions. In this manner the loop forming and gate pressure arrangements are considerably simplified.

Referring now to Figs. 3 and 4, a pair of posts 49 are mounted upon the frame 45. The resilient or spring member 50 has side flanges 51, a pair of integral spring tabs 52 for bearing against the pressure pad 53, and at each end has a pair of tongues 54 for partially encircling said posts 49. The spring action of the tabs 52 not only holds the pressure pad 53 against the film and front gate member but also causes a reaction which holds said tongues 54 against posts 49. Each pair of tongues 54 is spaced so as to engage the margins of the film strip F, see Fig. 4, and each functions in exactly the same manner as the previously mentioned loop forming studs 44 and 46. A loose pin and slot connection may be provided between said spring member 50 and pressure pad 53 and may comprise a headed pin 55 fixed to pressure pad 53 and extending rearwardly through a bayonet slot 56 provided in spring member 50. A circular depression 57 may encompass said slot 56.

Other modifications of the invention will be clear to those skilled in the art and the present invention is to be limited only by the scope of the appended claims.

Having now particularly described my invention what I desire to secure by Letters Patent of the United States and what I claim is:

1. In a sprocketless film handling apparatus, the combination with a mounting means having a wall provided with an exposure aperture, a pressure member for holding a film strip across said aperture and forming therewith a film gate, and a pair of supports on said mounting means each for rotatably supporting a film roll, of a pair of loop forming members, each respectively fixed adjacent opposite ends of said film gate, each located to engage the film strip which extends between said film gate and the farther side of each film roll, and each arranged to displace said film strip from the straight line paths between said gate and film rolls so that the inherent resiliency of the film causes the formation of a film loop in said film strip, said supports and said fixed loop forming members being relatively located so that said film rolls are supported with their opposite sides respectively beyond said loop forming members.

2. In a sprocketless film handling apparatus, the combination with a mounting means having a wall provided with an exposure aperture, a pressure member for holding a film strip across said aperture and forming therewith a film gate, and a pair of supports on said mounting means each for rotatably supporting a film roll, of a pair of loop forming members, each respectively fixed adjacent opposite ends of said film gate, each displaced from the film plane of said film gate toward said film rolls, and each located intermittently to engage the film strips which extend between said film gate and each film roll and to displace said film strips from the straight line paths between said gate and film roll so that the inherent resiliency of the film causes the formation of a film loop in said film strip, said supports and said fixed loop forming members being relatively located so that said film rolls are supported with their opposite sides respectively beyond said loop forming members.

3. In a sprocketless film handling apparatus, the combination with a mounting means having a wall provided with an exposure aperture, a pressure member for holding a film strip across said aperture and forming therewith a film gate, and a support on said mounting means for rotatably supporting a supply film roll, of a loop forming member fixed adjacent the entrance to said film gate, located to engage the film strip which extends between said film gate and the farther side of the supply film roll, and arranged to displace said film strip from the straight line path between said gate and film roll so that the inherent resiliency of the film causes the formation of a film loop in said film strip and momentarily moves said film strip out of engagement with said loop forming member, said support and said fixed loop forming member being relatively located with respect to each other so that the paying-off side of said supply film roll is beyond said loop forming member in the direction away from said film gate.

4. In a sprocketless film handling apparatus, the combination with a mounting means having a wall provided with an exposure aperture, a pressure member for holding a film strip across said aperture and forming therewith a film gate, and a support on said mounting means for rotatably supporting a takeup film roll, of a loop forming member fixed adjacent the exit from said film gate, located to engage the film strip which extends between said film gate and the farther side of the takeup film roll, and arranged to displace said film strip from the straight line path between said gate and film roll so that the inherent resiliency of the film causes the formation of a film loop in said film strip and momentarily moves said film strip out of engagement with said loop forming member, said support and said fixed loop forming member being relatively located with respect to each other so that the paying-in side of said takeup film roll is beyond said loop forming member in the direction away from said film gate.

5. In a sprocketless film handling apparatus, the combination with a mounting means having a wall provided with an exposure aperture, a pressure member for holding a film strip across said aperture and forming therewith a film gate, and a pair of supports on said mounting means each for rotatably supporting a film roll, of a pair of posts each adjacent opposite ends of said film gate, and a resilient member for engaging said pressure member and including at each end a pair of tongues for connection to said posts, each pair of tongues being spaced to engage the margins of the film strip between said gate and respective film roll and being located to displace said film strip from the straight line paths between said film gate and film roll.

6. In a sprocketless film handling apparatus, the combination with a mounting means having a wall provided with an exposure aperture, a pressure member for holding a film strip across said aperture and forming therewith a film gate, a support on said mounting means, and a supply film roll mounted on said support and wound for overshot feeding to said film gate, of a loop forming member fixed adjacent the entrance to said film gate, displaced from the film plane of said gate toward said film roll, located intermittently to engage the overfed film strip, and arranged to displace the same from the straight line path between said gate and supply film roll so that the inherent resiliency of the film causes the formation of a film loop in said film strip and momentarily moves said film strip out of engagement with said loop forming member, said support and said fixed loop forming member being relatively located with respect to each other so that the paying-off side of said supply film roll is beyond said loop forming member in the direction away from said film gate.

7. In a sprocketless film handling apparatus, the combination with a mounting means having a wall provided with an exposure aperture, a pressure member for holding a film strip across said aperture and forming therewith a film gate, a driven take-up support on said mounting means, and a take-up film roll mounted on said support which is rotated for undershot feeding of the film strip from said film gate, of a loop-forming member fixed adjacent the exit from said film gate, displaced from the film plane of said gate toward said film roll, located intermittently to engage the underfed film strip, and arranged to displace the same from the straight line path between said gate and take-up film roll so that the inherent resiliency of the film causes the formation of a film loop in said film strip and momentarily moves said film strip out of engagement with said loop forming member, said support and said fixed loop forming member being relatively located with respect to each other so that the paying-in side of said take-up film roll is beyond said loop-forming member in the direction away from said film gate.

HENRY N. FAIRBANKS.